(12) United States Patent
Hällfors

(10) Patent No.: US 11,117,350 B2
(45) Date of Patent: Sep. 14, 2021

(54) WALL STRUCTURE

(71) Applicant: Framery Oy, Tampere (FI)

(72) Inventor: Samu Hällfors, Tampere (FI)

(73) Assignee: Framery Oy, Tampere (FI)

( * ) Notice: Subject to any disclaimer, the term of this patent is extended or adjusted under 35 U.S.C. 154(b) by 327 days.

(21) Appl. No.: 16/073,443

(22) PCT Filed: Jan. 30, 2017

(86) PCT No.: PCT/FI2017/050051
§ 371 (c)(1),
(2) Date: Jul. 27, 2018

(87) PCT Pub. No.: WO2017/134341
PCT Pub. Date: Aug. 10, 2017

(65) Prior Publication Data
US 2020/0324515 A1    Oct. 15, 2020

(30) Foreign Application Priority Data

Feb. 2, 2016 (FI) ...................................... 20165069

(51) Int. Cl.
*B32B 15/04* (2006.01)
*B32B 3/06* (2006.01)
(Continued)

(52) U.S. Cl.
CPC .............. *B32B 15/046* (2013.01); *B32B 3/06* (2013.01); *B32B 5/18* (2013.01); *B32B 5/32* (2013.01);
(Continued)

(58) Field of Classification Search
CPC ......... B32B 15/046; B32B 7/12; B32B 21/02; B32B 5/18; B32B 27/065; B32B 21/047;
(Continued)

(56) References Cited

U.S. PATENT DOCUMENTS 4,838,524 A * 6/1989 McKeown ............ E01F 8/0011
181/210
5,123,874 A    6/1992 White, III
(Continued)

FOREIGN PATENT DOCUMENTS

DE    3710057 A1 * 12/1988 ........... E04B 2/7403
EP    1061190 A1    12/2000
(Continued)

OTHER PUBLICATIONS

Finnish Patent and Registration Office, Search Report, Application No. 20165069, dated Aug. 29, 2016, 2 pages.
(Continued)

*Primary Examiner* — Adriana Figueroa
(74) *Attorney, Agent, or Firm* — Ziegler IP Law Group, LLC

(57) ABSTRACT

A wall structure with a first dampening element (A) includes at least one layer (20,20*a-c*) configured to form an acoustic inner surface and/or to dampen sound; a first stopping element (B) including at least one layer (30) configured to stop sound; a second dampening element (C) including at least one layer (40,40',50) configured to form an acoustic inner surface and/or to dampen sound; and a second stopping element (D) comprising at least one layer (60) configured to stop sound; wherein the layers of the first (A) and second (C) dampening element comprise porous and/or open cell material.

20 Claims, 4 Drawing Sheets

(51) Int. Cl.
*B32B 5/18* (2006.01)
*B32B 5/32* (2006.01)
*B32B 7/12* (2006.01)
*B32B 21/02* (2006.01)
*B32B 21/04* (2006.01)
*B32B 21/14* (2006.01)
*B32B 27/06* (2006.01)
*E04B 2/00* (2006.01)
*E04H 1/14* (2006.01)

(52) U.S. Cl.
CPC ............... *B32B 7/12* (2013.01); *B32B 21/02* (2013.01); *B32B 21/047* (2013.01); *B32B 21/14* (2013.01); *B32B 27/065* (2013.01); *E04C 2/46* (2013.01); *E04H 1/14* (2013.01); *B32B 2266/06* (2013.01); *B32B 2307/102* (2013.01); *B32B 2307/72* (2013.01); *B32B 2419/00* (2013.01); *B32B 2607/00* (2013.01)

(58) Field of Classification Search
CPC .. B32B 21/14; B32B 3/06; B32B 5/32; B32B 2307/102; B32B 2607/00; B32B 2307/72; B32B 2419/00; B32B 2266/06; E04H 1/14; E04C 2/46; E04B 2001/8461; E04B 1/86; E04B 1/90
See application file for complete search history.

(56) References Cited

U.S. PATENT DOCUMENTS

| | | | | |
|---|---|---|---|---|
| 5,186,996 | A * | 2/1993 | Alts | .......................... B32B 5/22 428/72 |
| 5,512,715 | A | 4/1996 | Takewa et al. | |
| 5,518,806 | A * | 5/1996 | Eder | .................. B29C 44/5636 181/288 |
| 5,923,002 | A * | 7/1999 | McGrath | .................... B32B 5/26 181/290 |
| 6,122,867 | A * | 9/2000 | Leconte | .................... E04B 1/82 52/144 |
| 6,189,649 | B1 | 2/2001 | Nitschke | |
| 6,789,645 | B1 * | 9/2004 | Deblander | ................ E04B 1/86 181/284 |
| 8,573,357 | B1 * | 11/2013 | Hibbs | ....................... E06B 5/20 181/287 |
| 8,590,272 | B2 * | 11/2013 | Thomas | .................. B32B 13/02 52/784.11 |
| 8,631,899 | B2 * | 1/2014 | Zickmantel | .......... G10K 11/168 181/286 |
| 2013/0112499 | A1 | 5/2013 | Kitchen et al. | |

FOREIGN PATENT DOCUMENTS

| | | | | |
|---|---|---|---|---|
| FR | 2733261 | A1 | 10/1996 | |
| GB | 1417133 | A * | 12/1975 | ............. B32B 21/10 |
| GB | 1467811 | A * | 3/1977 | ............... B32B 5/18 |
| GB | 1467811 | A | 3/1977 | |
| GB | 2051176 | A * | 1/1981 | ............... E04B 1/86 |
| GB | 2051176 | A | 1/1981 | |
| JP | H10-121600 | A | 5/1998 | |
| JP | 2002002408 | A | 1/2002 | |
| JP | 2010053637 | A | 3/2010 | |
| JP | 2013-194475 | A | 9/2013 | |
| JP | 2015-229839 | A | 12/2015 | |
| KR | 10-2006-0095631 | A | 9/2006 | |
| KR | 100799284 | B1 | 1/2008 | |
| TW | I299853 | B | 8/2008 | |
| WO | 9523406 | A1 | 8/1995 | |
| WO | 2007040265 | A1 | 4/2007 | |
| WO | 2012161695 | A1 | 11/2012 | |

OTHER PUBLICATIONS

International Search Report and Written Opinion of the International Searching Authority, Application No. PCT/FI2017/050051, dated Apr. 19, 2017, 13 pages.
Taiwan Search Report, Application No. 106103457, dated Feb. 2, 2016, 1 page.
International Preliminary Report on Patentability, Application No. PCT/FI2017/050051, dated Apr. 12, 2018, 15 pages.
Office Action for Canadian Patent Application No. CA3013106, dated Sep. 25, 2019, 4 pages.
Notification of Ground of Rejection for Japanese Patent Application No. JP2018-540012, dated Sep. 19, 2019, 7 pages including 4 pages of English translation.
Japan Patent Office, Notification of ground of rejection, Application No. 2020-126044, dated Jun. 8, 2021, 5 pages, English Translation Attached, 5 pages.

* cited by examiner

WALL STRUCTURE

TECHNICAL FIELD

The present application generally relates to a wall structure. In particular, but not exclusively, the present application relates to a soundproof and acoustical wall structure, especially for relatively small spaces.

BACKGROUND

This section illustrates useful background information without admission of any technique described herein being representative of the state of the art.

Various wall materials and structures have been developed for soundproofing purposes. Furthermore, various acoustical surface materials, such as acoustical panels and fabrics, have been developed to improve the sound quality or characteristics in a space.

In small spaces, such as in phone booths or conference rooms for open-plan offices, the soundproofing and sound quality is of foremost importance and challenging to control because of space restrictions.

Existing solutions for soundproofing and acoustics are often expensive or difficult to assemble. Furthermore, they often require lot of space leading to bulky and unwieldy structures.

The aspects of the disclosed embodiments aim to mitigate the disadvantages of the prior art by providing a compact soundproof wall structure that also ensures sound quality in the soundproofed space.

SUMMARY

Various aspects of examples of the aspects of the disclosed embodiments are set out in the claims.

According to a first example aspect of the aspects of the disclosed embodiments, there is provided a wall structure, comprising a first dampening element comprising at least one layer configured to form an acoustic inner surface and/or to dampen sound;
  a first stopping element comprising at least one layer configured to stop sound;
  a second dampening element comprising at least one layer configured to form an acoustic inner surface and/or to dampen sound; and
  a second stopping element comprising at least one layer configured to stop sound; wherein
  the layers of the first (A) and second (C) dampening element comprise porous and/or open cell material.

The at least one layer of the first stopping element may comprise metal.

The at least one layer of the first stopping element may have a thickness between 0.5 and 2 mm, preferably of 1 mm.

The at least one layer of the second stopping element may comprise material chosen from the group of plywood, hardboard, plastic, composite, metal and a combination thereof.

The at least one layer of the second stopping element may have a thickness between 5 and 15 mm, preferably of 9 mm.

The first dampening element may comprise a first layer comprising porous or open cell material and a second layer comprising porous or open cell material.

The material of the first layer may have a density between 50 and 250 $kg/m^3$, preferably between 150 and 250 $kg/m^3$ and most preferably about 200 $kg/m^3$ and the material of the second layer may have a density between 10 and 100 $kg/m^3$, preferably between 30 and 50 $kg/m^3$ and most preferably of about 40 $kg/m^3$.

The first layer may have a thickness between 5 and 15 mm, preferably of 10 mm and the second layer may have a thickness between 30 and 50 mm, preferably of 40 mm The second dampening element may comprise a fourth layer comprising porous or open cell material and a fifth layer comprising an air gap.

The material of the fourth layer may have a density between 10 and 150 $kg/m^3$, preferably between 60 and 100 $kg/m^3$ and most preferably of about 80 $kg/m^3$.

The fourth layer may have a thickness between 20 and 40 mm, preferably of 30 mm and the fifth layer may have a thickness between 5 and 15 mm, preferably of 10 mm.

The wall structure may further comprise a frame element at both ends of the structure.

According to a second example f the aspects of the disclosed embodiments, there is provided a phone booth, comprising walls comprising the wall structure of the first example aspect.

According to a third example aspect of the aspects of the disclosed embodiments, there is provided a method of manufacturing the wall structure of the first example aspect by
  providing the frame elements;
  providing the first dampening element;
  providing the first stopping element;
  providing the second dampening element; and
  providing the second stopping element.

Different non-binding example aspects and embodiments of the aspects of the disclosed embodiments have been illustrated in the foregoing. The embodiments in the foregoing are used merely to explain selected aspects or steps that may be utilized in implementations of the aspects of the disclosed embodiments. Some embodiments may be presented only with reference to certain example aspects of the present disclosure. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

The aspects of the disclosed embodiments and its potential advantages are understood by referring to FIGS. 1 through 6 of the drawings. In this document, like reference signs denote like parts or steps.

Figure 1:
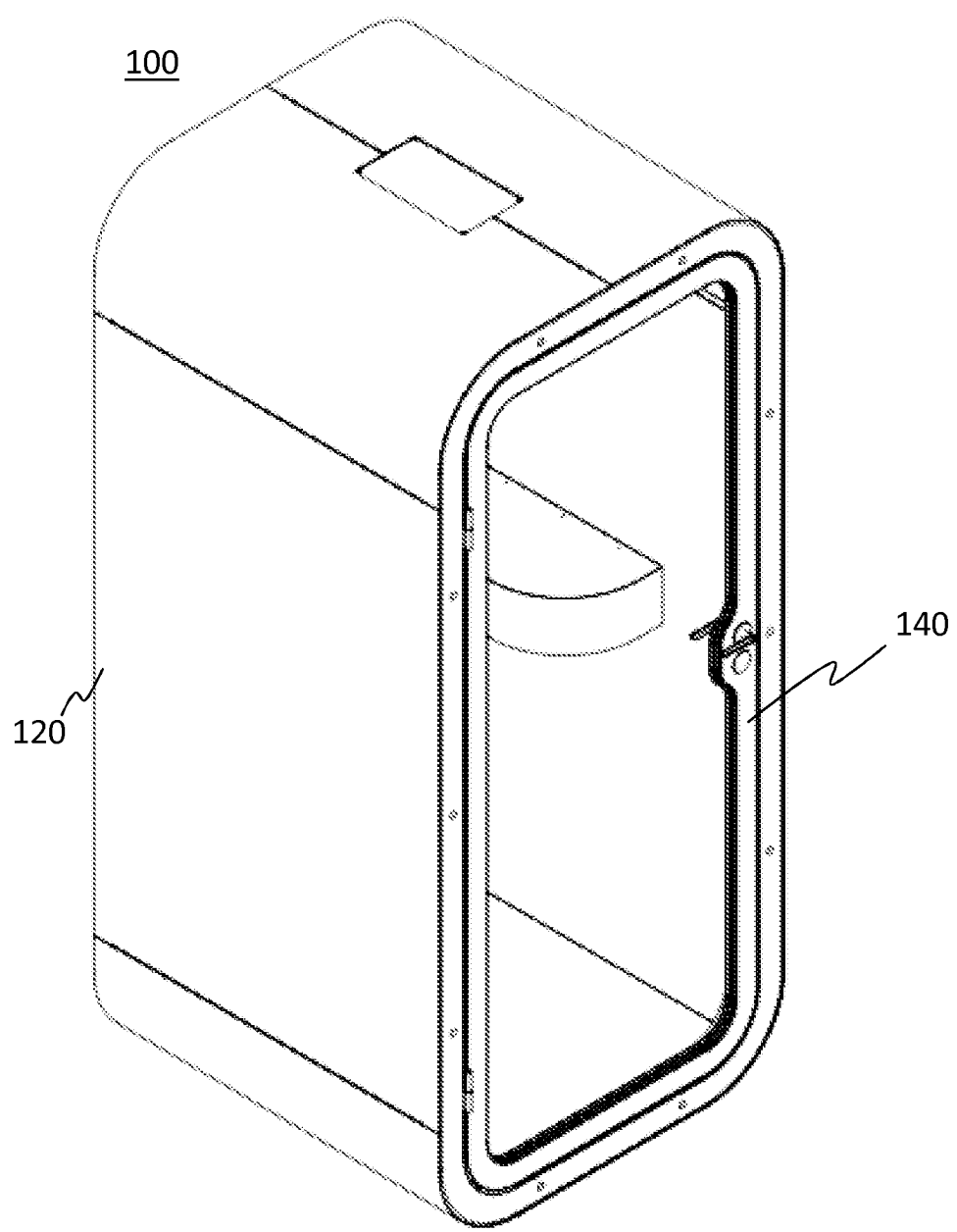
FIG. 1 shows a principle view of a phone booth for example in which an embodiment of the present disclosure is used.

FIG. 1 shows a principle view of a phone booth for example in which an embodiment of the present disclosure is used. The phone booth 100 comprises walls 120 and a door 140. The wall structure 200 (FIG. 2) according to an embodiment of the invention is for example used in the walls 120 of the phone booth 100. The wall structure 200 according to an embodiment of the invention is further used for example as an additional structure on top of an existing wall in order to increase acoustics and sound dampening of the space in which the existing wall is situated. Furthermore, the wall structure 200 according to the invention is for example used in vehicles, in engine rooms and in encapsulation, housing or casings of different kinds for example for machines.

Figure 2:
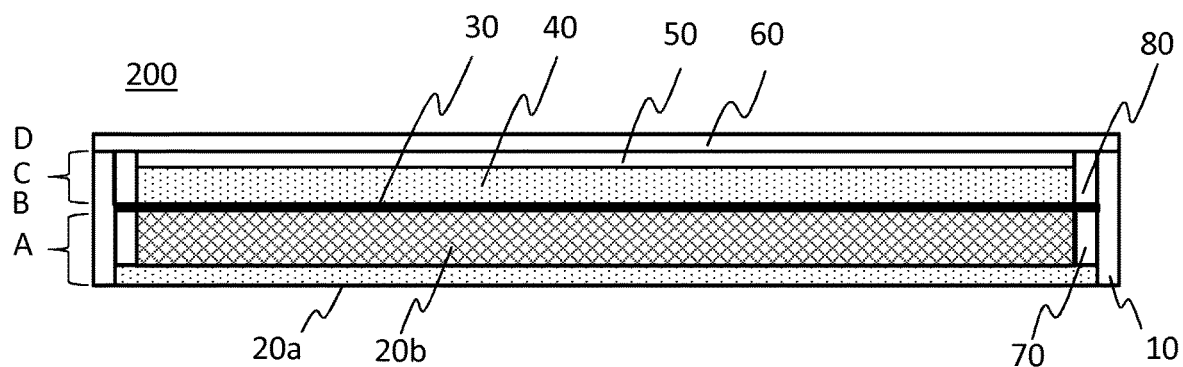
FIG. 2 shows a schematic view of a cross section of a wall structure according to an embodiment of the present disclosure.

FIG. 2 shows a schematic view of a cross section of a wall structure 200 according to an embodiment of the present disclosure. The cross section shown is in direction perpendicular to the wall with the inner surface of the wall shown lower and the outer surface shown higher. The wall structure 200 comprises a first dampening element A, a first stopping element B, a second dampening element C and a second stopping element D the structure and function of which will be described hereinafter. Furthermore, the wall structure 200 comprises a frame element 10, at both ends of the structure. In an embodiment, the frame element 10 comprises material such as plywood, hardboard, plastic, composite, metal or a combination thereof. In an embodiment, the material of the frame element 10 has certain characteristics as hereinafter described.

The wall structure 200 in a further embodiment further comprises support elements 70,80 on both ends of the wall structure 200. In an embodiment, the support elements 70,80 comprise material such as plywood, hardboard, plastic, composite, metal or a combination thereof. In further embodiment, the support elements 70,80 are integrated with the frame elements 10.

FIG. 2 further shows the layers of the elements A,B,C,D of the wall structure 200 configured to provide for the acoustic and soundproofing effect. In an embodiment, the layers and the elements of the wall structure 200 are attached to each other in a conventional manner, for example using glue.

Starting from the inner surface of the wall structure 200, the first dampening element A of the wall structure comprises a first, or inner surface, layer 20a configured to provide for the acoustic and soundproofing effect. The first layer 20 comprises porous or open cell material and is configured to form an acoustical inner surface of the wall with desired acoustical properties, i.e. configured to let certain sound frequencies pass in order to improve the acoustical properties of the space. The first layer 20a comprises material that is resistant to wear and permeable to air, i.e. breathing. In an embodiment, the first layer 20a comprises material such as felt, foam rubber, polyester fibre, glass wool, rock wool, mineral wool, canvas, canvas covered material or a combination thereof. In an embodiment, the density of the first layer 20a is between 50 and 250 kg/m$^3$, preferably between 150 and 250 kg/m$^3$ and most preferably of about 200 kg/m$^3$.

The first dampening element A of the wall structure 200 further comprises, after the first layer 20a, a second, or inner damping, layer 20b configured to provide for the acoustic and soundproofing effect. The second layer 20b comprises porous or open cell material and is configured to absorb and dampen the sound. In an embodiment, the second layer 20b comprises material such as felt, foam rubber, polyester fibre, glass wool, rock wool, mineral wool or a combination thereof. In an embodiment, the density of the second layer 20b is between 10 and 100 kg/m$^3$, preferably between 30 and 50 kg/m$^3$ and most preferably of about 40 kg/m$^3$.

The first stopping element B of the wall structure 200 comprises, after the second layer 20b, a third, or stopping, layer 30 configured to provide for the acoustic and soundproofing effect. The third layer 30 comprises material configured to stop sound. In an embodiment, the material of the third layer 30 comprises metal or medium-density fibreboard (MDF). In an embodiment, the material of the third layer has an area density of 5 to 15 kg/m$^2$. In a further embodiment, the material of the third layer 30 comprises steel, lead, or copper. In an embodiment, the third layer 30 is sandwiched between the support elements 70,80 as shown in FIG. 1.

The second damping element C of the wall structure 200 comprises, after the third layer 30, a fourth, or outer damping, layer 40 configured to provide for the acoustic and soundproofing effect. The fourth layer 40 comprises porous or open cell material and is configured to absorb and dampen the sound. In an embodiment, the fourth layer 40 comprises material such as felt, foam rubber, polyester fibre, glass wool, rock wool, mineral wool or a combination thereof. In an embodiment, the density of the fourth layer 40 is between 10 and 150 kg/m$^3$, preferably between 60 and 100 kg/m$^3$ and most preferably of about 80 kg/m$^3$.

The second damping element C of the wall structure 200 comprises, after the fourth layer 40, a fifth, or air, layer 50 configured to provide for the acoustic and soundproofing effect. The fifth layer 50 comprises an air gap configured to form together with the fourth layer a dampened air gap in order to dampen sound.

The second stopping element D of the wall structure 200 comprises, after the fifth layer 50, a sixth, or outer, layer 60 configured to provide for the acoustic and soundproofing effect. The sixth layer is configured to form the outer surface of the wall structure 200 and comprises material configured to stop the sound. In an embodiment, the sixth layer 60 comprises material such as plywood, hardboard, plastic, composite, metal or a combination thereof. In an embodiment, the material of the frame element 60 has certain characteristics as hereinafter described. In a further embodiment, the wall structure 200 comprises one or several additional air gaps configured to dampen sound in between the elements described hereinbefore. In a still further embodiment the air gap 50 and/or further air gaps are configured to, in addition to dampening sound, to be used as channels for electrical wiring and the like.

In an embodiment, for example as the wall structure 200 is used in a phone booth 100 of FIG. 1, the material of the frame elements 10, the outer layer 60 and the support elements 70,80 comprises material having certain characteristics. In an embodiment, the material has a module of elasticity perpendicular to the surface larger than about 5500 N/mm$^2$, a module of elasticity parallel to the surface larger than about 7000 N/mm$^2$ and a flexural strength larger than about 33 N/mm$^2$.

The wall structure 200 according to embodiments of the present disclosure provides for a compact size while retaining soundproofing and acoustical quality. Accordingly, the dimensions of the layers of the wall structure are chosen so that the thickness of the wall structure 200 is between 50 and 150 mm, preferably between 80 and 120 mm, and more preferably about 100 mm. In an embodiment, as an example, the thickness of the first to sixth layers is as follows

| Thickness   | Range mm               | Preferred mm      |
|-------------|------------------------|-------------------|
| 1st layer 20a | 5-15                 | 10                |
| 2nd layer 20b | 30-50                | 40                |
| 3rd layer 30  | 0, 5-2 (metal), 7-12 (MDF) | 1 (metal), 9 (MDF) |
| 4th layer 40  | 20-40                | 30                |
| 5th layer 50  | 5-15                 | 10                |
| 6th layer 60  | 5-15                 | 9                 |

Figure 3:
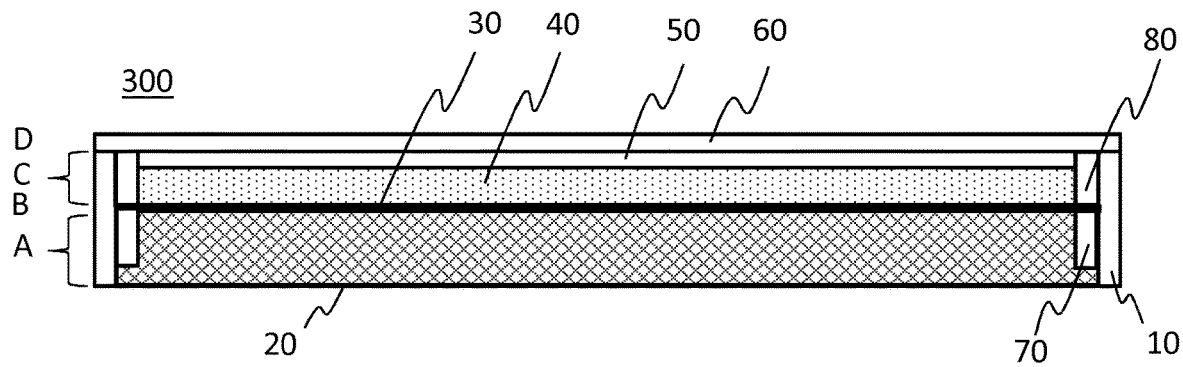
FIG. 3 shows a further schematic view of a cross section of a wall structure according to an embodiment of the invention.

FIG. 3 shows a further schematic view of a cross section of a wall structure 300 according to an embodiment of the invention. The frame elements 10, the support elements 70,80 and the third to sixth layers 30-60 have a structure as hereinbefore described with reference to FIG. 2. The first damping element of the wall structure 300 comprises at the inner surface thereof a first, or inner surface and damping, layer 20 configured to provide for the acoustic and soundproofing effect instead of the first layer 20a and second layer 20b as described with reference to FIG. 2.

The first layer 20 comprises porous or open cell material configured to form the inner surface of the wall with desired acoustical properties, i.e. configured to let certain sound frequencies pass in order to improve the acoustical properties of the space. Furthermore, the first layer 20 is configured to absorb and dampen the sound. In an embodiment, the first layer 20a comprises material that is resistant to wear and permeable to air, i.e. breathing. In an embodiment, the first layer 20a comprises material such as felt, foam rubber, polyester fibre, glass wool, rock wool, mineral wool or a combination thereof. In an embodiment, the density of the first layer 20a is between 10 and 250 kg/m$^3$ and preferably between 30 and 200 kg/m$^3$.

Figure 4:
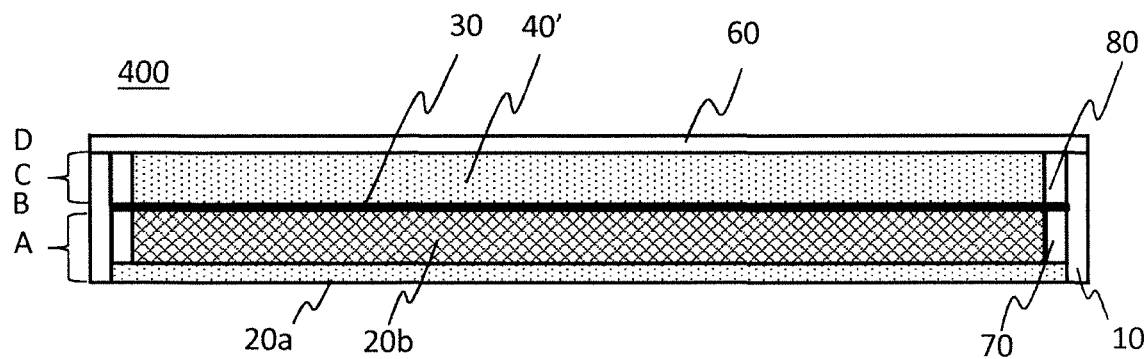
FIG. 4 shows a further schematic view of a cross section of a wall structure according to an embodiment of the present disclosure.

FIG. 4 shows a further schematic view of a cross section of a wall structure 400 according to an embodiment of the present disclosure. The frame elements 10, the support elements 70,80 and the first to third and sixth layers 20a-30,60 have a structure as hereinbefore described with reference to FIG. 2. The second damping element of the wall structure 400 comprises a fourth, outer damping, layer 40' configured to provide for the acoustic and soundproofing effect and extending from the third layer to the sixth layer, i.e. there is no air gap 50 (FIG. 2) between the fourth layer 40' and the sixth layer 60.

The fourth layer 40' comprises porous or open cell material and is configured to absorb and dampen the sound. In an embodiment, the fourth layer 40' comprises material such as felt, foam rubber, polyester fibre, glass wool, rock wool, mineral wool or a combination thereof. In an embodiment, the density of the fourth layer 40b is between 10 and 150 kg/m$^3$, preferably between 60 and 100 kg/m$^3$ and most preferably of about 80 kg/m$^3$.

Figure 5:
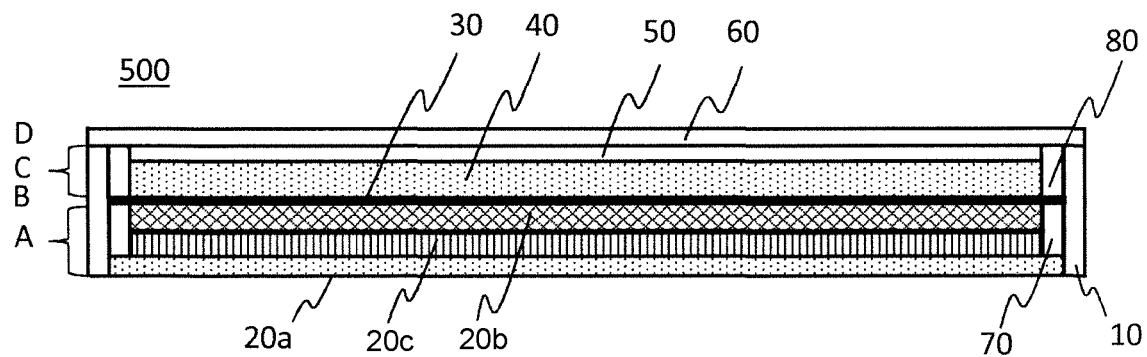
FIG. 5 shows a further schematic view of a cross section of a wall structure according to an embodiment of the present disclosure.

FIG. 5 shows a further schematic view of a cross section of a wall structure 500 according to an embodiment of the present disclosure. The frame elements 10, the support elements 70,80 and the first to sixth layers 20a-60 have a structure as hereinbefore described with reference to FIG. 2. The first damping element A of the wall structure 500 further comprises a further layer, or second inner damping layer, 20c between the first 20a and the second 20b layers configured to provide for the acoustic and soundproofing effect.

The further layer 20c comprises porous or open cell material and is configured to absorb and dampen the sound. In an embodiment, the further layer 20c comprises material such as felt, foam rubber, polyester fibre, glass wool, rock wool, mineral wool or a combination thereof. In an embodiment, the density of the further layer 20c is between 30 and 150 kg/m$^3$, preferably between 50 and 100 kg/m$^3$ and most preferably of about 75 kg/m$^3$.

A skilled person understands that features of the embodiments described hereinbefore with reference to FIGS. 2 to 5 are combined into further embodiments of the present disclosure, not shown in Figs, for example into an embodiment with the wall structure as described with reference to FIG. 2 but without the air gap 50. Furthermore, the skilled person appreciates that the first B and/or second D stopping element of the wall structure 200,300,400,500 in a further embodiment comprises several layers instead of the single one described hereinbefore. For example the third layer 30, e.g. a steel plate, of the first stopping element in an embodiment comprises a laminate structure with several layers.

Furthermore, the skilled person understands that the use of wall structure hereinbefore described is not limited to vertical walls, but is readily applicable for example to use in horizontal structures such as roofs or floors.

Figure 6:
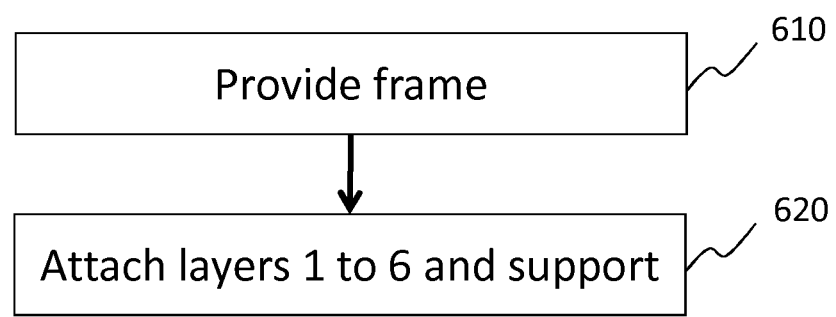
FIG. 6 shows a flow chart of a method of manufacturing a wall structure according to an embodiment of the present disclosure.

FIG. 6 shows a flow chart of a method of manufacturing a wall structure according to an embodiment of the present disclosure. At step 610 the frame elements 10 are provided. At step 620, the elements (A-D) with the layers 20a-60 are attached in a conventional manner.

Without in any way limiting the scope, interpretation, or application of the claims appearing below, a technical effect of one or more of the example embodiments disclosed herein is providing a compact soundproof structure for a compact space. Another technical effect of one or more of the example embodiments disclosed herein is providing an improved soundproofing of a wall. Another technical effect of one or more of the example embodiments disclosed herein is improved acoustics of a compact space without sacrificing soundproof ness.

Although various aspects of the present disclosure are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the aspects of the disclosed embodiments as defined in the appended claims.

The invention claimed is:

1. A wall structure comprising in the order of appearance:
   a first dampening element, a first stopping element, a second dampening element, and a second stopping element, wherein
   the first dampening element comprises at least one layer comprising porous or open cell material to form an acoustic inner surface of the wall structure and to dampen sound, the first dampening element constituting a first exterior surface of the wall structure;
   the first stopping element comprises at least one continuous layer to stop sound;
   the second dampening element comprises at least one layer comprising porous or open cell material to dampen sound, the second dampening element further comprising an air layer that is adjacent to the at least one layer comprising the porous or open cell material of the second dampening element; and
   the second stopping element comprises at least one continuous layer to stop sound, which is adjacent to the air layer and constitutes a second exterior surface of the wall structure.

2. The wall structure of claim 1, wherein the at least one continuous layer of the first stopping element comprises metal.

3. The wall structure of claim 2, wherein the at least one continuous layer of the first stopping element has a thickness between 0.5 mm and 2 mm.

4. The wall structure of claim 1, wherein the at least one continuous layer of the second stopping element comprises material chosen from the group of plywood, hardboard, plastic, composite, metal and a combination thereof.

5. The wall structure of claim 1, wherein the at least one continuous layer of the second stopping element has a thickness between 5 mm and 15 mm.

6. The wall structure of claim 1, wherein the first dampening element comprises a first layer comprising porous or open cell material and a second layer comprising porous or open cell material.

7. The wall structure of claim 6, wherein the material of the first layer has a density between 50 kg/m$^3$ and 250 kg/m$^3$, and the material of the second layer has a density between 10 kg/m$^3$ and 100 kg/m$^3$.

8. The wall structure of claim 6, wherein the first layer has a thickness between 5 mm and 15 mm, and the second layer has a thickness between 30 mm and 50 mm.

9. The wall structure of claim 1, wherein the material of said at least one layer comprised by the second dampening element has a density between 10 kg/m$^3$ and 150 kg/m$^3$.

10. The wall structure of claim 1, wherein said at least one layer comprised by the second dampening element has a thickness between 20 mm and 40 mm, and the air layer has a thickness between 5 mm and 15 mm.

11. The wall structure of claim 1, further comprising a frame element at both ends of the wall structure.

12. A phone booth, comprising walls comprising the wall structure of claim 1.

13. A Method of manufacturing the wall structure of claim 1 by
providing frame elements;
providing the first dampening element;
providing the first stopping element;
providing the second dampening element; and
providing the second stopping element.

14. An enclosure comprising a wall structure comprising in the order of appearance:
a first dampening element, a first stopping element, a second dampening element, and a second stopping element, wherein
the first dampening element comprises at least one layer comprising porous or open cell material to form an acoustic inner surface of the wall structure and to dampen sound, the at least one layer comprising the porous or open cell material constituting a first exterior surface of the wall structure, facing an interior space defined by the enclosure;
the first stopping element comprises at least one layer to stop sound;
the second dampening element comprises at least one layer comprising porous or open cell material to dampen sound, the second dampening element further comprising an air layer; and
the second stopping element comprises at least one layer to stop sound, which is adjacent to the air layer and constitutes a second exterior surface of the wall structure, facing an exterior space outside the enclosure.

15. The enclosure of claim 14, wherein the first dampening element comprises a first layer comprising porous or open cell material and a second layer comprising porous or open cell material.

16. The enclosure of claim 15, wherein the material of the first layer has a density between 50 kg/m3 and 250 kg/m3, and the material of the second layer has a density between 10 kg/m3 and 100 kg/m3.

17. The enclosure of claim 15, wherein the first layer has a thickness between 5 mm and 15 mm, and the second layer has a thickness between 30 mm and 50 mm.

18. The enclosure of claim 14, wherein the material of said at least one layer comprised by the second dampening element has a density between 10 kg/m3 and 150 kg/m3.

19. The enclosure of claim 14, wherein said at least one layer comprised by the second dampening element has a thickness between 20 mm and 40 mm, and the air layer has a thickness between 5 mm and 15 mm.

20. The enclosure of claim 14, wherein the enclosure is a soundproof phone booth.

* * * * *